(12) United States Patent
Andrews

(10) Patent No.: US 12,330,778 B2
(45) Date of Patent: Jun. 17, 2025

(54) HIGH-SPEED, VERTICAL TAKE-OFF AND LANDING AIRCRAFT

(71) Applicant: Kymatics, LLC, Pleasanton, CA (US)

(72) Inventor: Joseph John Andrews, Oakland, CA (US)

( * ) Notice: Subject to any disclaimer, the term of this patent is extended or adjusted under 35 U.S.C. 154(b) by 567 days.

(21) Appl. No.: 17/780,739

(22) PCT Filed: Dec. 8, 2020

(86) PCT No.: PCT/US2020/063697
§ 371 (c)(1),
(2) Date: May 27, 2022

(87) PCT Pub. No.: WO2021/201927
PCT Pub. Date: Oct. 7, 2021

(65) Prior Publication Data
US 2022/0355923 A1 Nov. 10, 2022

Related U.S. Application Data

(60) Provisional application No. 62/969,151, filed on Feb. 3, 2020, provisional application No. 62/946,435, filed on Dec. 11, 2019.

(51) Int. Cl.
*B64C 29/00* (2006.01)
*B64C 19/00* (2006.01)
(Continued)

(52) U.S. Cl.
CPC .......... *B64C 29/0008* (2013.01); *B64C 19/00* (2013.01); *B64C 27/72* (2013.01);
(Continued)

(58) Field of Classification Search
CPC ........ B64D 41/00; B64D 35/08; B64D 35/04; B64D 27/24; B64D 27/40; B64C 29/0008;
(Continued)

(56) References Cited

U.S. PATENT DOCUMENTS 3,181,810 A * 5/1965 Olson ................. B64C 29/0033
244/66
3,451,644 A * 6/1969 Laufer .................... B64C 27/20
244/123.7
(Continued)

FOREIGN PATENT DOCUMENTS

DE 3244050 A1 * 11/1982
WO WO-2018208652 A1 * 11/2018 ......... B64C 29/0025
WO WO-2019122926 A1 * 6/2019 ............. B64C 29/00

*Primary Examiner* — Joshua J Michener
*Assistant Examiner* — Aaron M Rodziwicz
(74) *Attorney, Agent, or Firm* — Michael A. Blake

(57) ABSTRACT

A high-speed vertical take-off and landing aircraft has a lifting structure, a first rotor with a first and second blade, a second rotor with a first and second blade, an auxiliary propulsion unit for providing forward thrust, and a control system for controlling the pitch of each of the rotor blades. The aircraft has a first, rotor-only, flight mode for hovering and low speed maneuvering. It also has a second flight mode where the rotors are held in at fixed azimuth angles and forward thrust is provided by the auxiliary propulsion unit. Three axis control is provided during the second flight mode by adjusting the attack angles of the fixed rotor blades. Between these two flight modes, there is an intermediate flight mode covering a fully controlled transition between the first two flight modes.

20 Claims, 7 Drawing Sheets

(51) Int. Cl.
*B64C 27/72* (2006.01)
*B64D 27/24* (2006.01)
*B64D 27/40* (2024.01)
*B64D 35/04* (2006.01)
*B64D 35/08* (2006.01)
*B64D 41/00* (2006.01)

(52) U.S. Cl.
CPC ............. *B64D 27/24* (2013.01); *B64D 27/40* (2024.01); *B64D 35/04* (2013.01); *B64D 35/08* (2013.01); *B64D 41/00* (2013.01); *B64C 2027/7205* (2013.01)

(58) Field of Classification Search
CPC .. B64C 27/72; B64C 2027/7205; B64C 19/00
See application file for complete search history.

(56) References Cited

U.S. PATENT DOCUMENTS

| | | | | |
|---|---|---|---|---|
| 4,979,698 | A * | 12/1990 | Lederman | B64C 29/0033 244/66 |
| 5,085,315 | A * | 2/1992 | Sambell | B64C 27/30 244/6 |
| 8,376,264 | B1 * | 2/2013 | Hong | B64C 27/26 244/17.23 |
| 9,475,585 | B2 * | 10/2016 | Hong | B64D 35/00 |
| 10,974,827 | B2 * | 4/2021 | Bevirt | B64C 27/28 |
| 10,988,248 | B2 * | 4/2021 | Mikić | B64U 50/13 |
| 10,994,829 | B2 * | 5/2021 | Duffy | B64C 29/0025 |
| 11,718,396 | B2 * | 8/2023 | Foskey | B64C 3/54 244/6 |
| 12,006,048 | B2 * | 6/2024 | Bevirt | B64D 27/357 |
| 2009/0014599 | A1 * | 1/2009 | Cylinder | B64U 10/10 244/7 R |
| 2015/0100181 | A1 * | 4/2015 | Strauss | B64D 31/16 701/3 |
| 2018/0215464 | A1 * | 8/2018 | Vetter | B64C 27/26 |

* cited by examiner

HIGH-SPEED, VERTICAL TAKE-OFF AND LANDING AIRCRAFT

CROSS-REFERENCE TO RELATED APPLICATIONS

This application is a US National Phase entry for International Application No. PCT/US2020/063697, titled "HIGH-SPEED, VERTICAL TAKE-OFF AND LANDING AIRCRAFT" filed on Dec. 8, 2020, which claims the benefit of, and priority to, U.S. Provisional Application No. 62/946,435, titled "HIGH-SPEED, VERTICAL TAKE-OFF AND LANDING AIRCRAFT" filed on Dec. 11, 2019, and U.S. Provisional Application No. 62/969,151, titled "ROTORCRAFT ACTIVE STABILITY CONTROL" filed on Feb. 3, 2020, the entire specifications of which are incorporated herein by reference.

TECHNICAL FIELD

The inventions described herein are in the field of vertical take-off and landing aircraft.

BACKGROUND ART

There is a long felt need for a vertical take-off and landing aircraft that is suitable for high-speed flight. There is also a long felt need for this same vertical take-off and landing aircraft to have low downwash during hover such that it can be used in a rescue operation of a person underneath. Further, there is a need for this same vertical take-off and landing aircraft that can operate entirely on battery power to enable more flexibility in the choice of power generation required to maintain flight in the battle with climate change.

DISCLOSURE OF INVENTION

The disclosure of invention is provided as a guide to understanding the invention. It does not necessarily describe the most generic embodiment of the invention or the broadest range of alternative embodiments.

FIG. 1A is a perspective view of a high-speed vertical take-off and landing aircraft 100. The aircraft may comprise:
a) a lifting structure 101;
b) a first rotor 102 comprising:
  i) a first blade 121; and
  ii) a second blade 122;
c) a second rotor 114 comprising:
  i) a first blade 123; and
  ii) a second blade 124;
d) an auxiliary propulsion unit 110; and
e) a control system 111 adapted to independently control an attack angle of each of said blades
wherein:
f) said first rotor:
  i) is adapted to be rotated about a first mast 103 to provide lift during a first flight mode; and
  ii) is adapted to be held at a constant first azimuth angle 301 (FIG. 3) during a second flight mode;
g) said second rotor:
  i) is adapted to be rotated about a second mast 115 to provide lift during said first flight mode; and
  ii) is adapted to be held at a constant second azimuth angle 302 (FIG. 3) during said second flight mode;
h) said auxiliary propulsion unit is adapted to provide forward thrust during said second flight mode; and
i) said control system is adapted to provide one or more of pitch, yaw, or roll control to said aircraft during said second flight mode by varying an attack angle (e.g. 314 FIG. 3) of at least one of said blades.

BRIEF DESCRIPTION OF DRAWINGS

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

BEST MODE FOR CARRYING OUT THE INVENTION

The detailed description describes non-limiting exemplary embodiments. Any individual features may be combined with other features as required by different applications for at least the benefits described herein. As used herein, the term "about" means plus or minus 10% of a given value unless specifically indicated otherwise.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

As used herein, a "computer-based system" comprises an input device for receiving data, an output device for outputting data in tangible form (e.g. printing or displaying on a computer screen), a permanent digital memory for storing data, computer code or other digital instructions, and a digital processor for executing digital instructions wherein said digital instructions resident in said permanent memory will physically cause said digital processor to read-in data via said input device, process said data within said microprocessor and output said processed data via said output device. The digital processor may be a microprocessor.

As used herein, equations represent short-hand notations of steps to be carried out on a computing device.

As used herein, the term "shaped" means that an item has the overall appearance of a given shape even if there are minor variations from the pure form of said given shape.

As used herein, the term "generally" when referring to a shape means that an ordinary observer will perceive that an object has said shape even if there are minor variations from said shape.

As used herein, relative orientation terms, such as "up", "down", "top", "bottom", "left", "right", "vertical", "horizontal", "distal" and "proximal" are defined with respect to an initial presentation of an object and will continue to refer to the same portion of an object even if the object is subsequently presented with an alternative orientation, unless otherwise noted.

High-Speed Vertical Take-Off and Landing Aircraft

Figure 1:
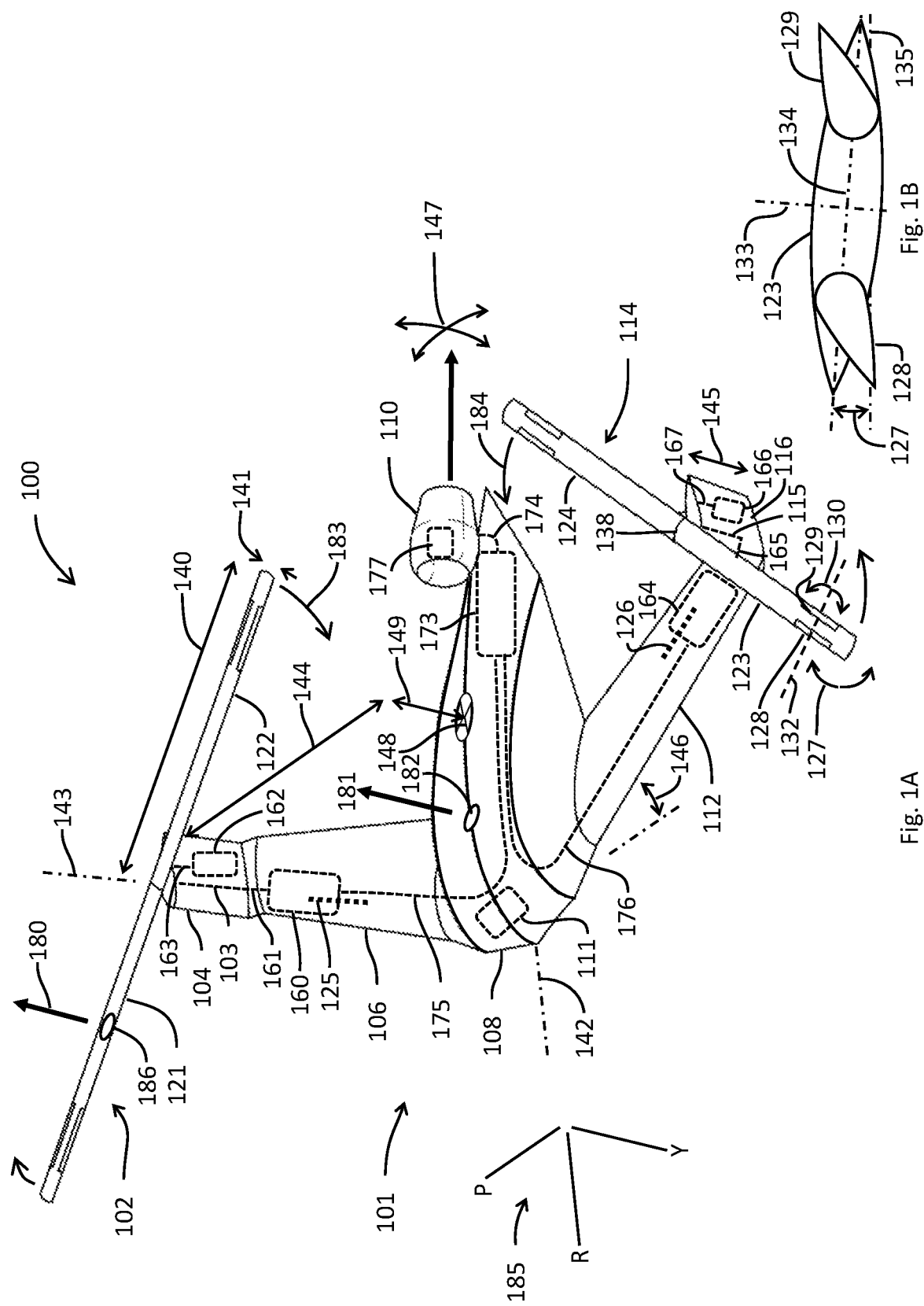
FIG. 1A is a perspective view of a high-speed, vertical take-off and landing aircraft.
FIG. 1B is a cross section of a blade of a rotor of the aircraft of FIG. 1A.

FIG. 1A is a perspective view of an exemplary high-speed vertical take-off and landing aircraft 100. As used herein, "high-speed" may include any forward speed up to and exceeding Mach 1.

The aircraft comprises:
- a) a lifting structure 101 comprising:
  - i) a right wing 106;
  - ii) a lifting body 108; and
  - iii) a left wing 112;
- b) a first rotor 102 mounted on a first mast 103;
- c) a first winglet 104 at an outer end of said right wing;
- d) a second rotor 114 mounted on a second mast 115;
- e) a second winglet 116 at an outer end of said left wing;
- f) a control system 111; and
- g) an auxiliary propulsion unit 110 adapted to provide forward thrust.

As used herein, a "lifting structure" may comprise any body capable of producing lift when air flows over it or it travels through air. Lifting structures may include wings, a lifting body, a blended wing body, a flying wing, a kite or any fixed wing aircraft. The lifting structure illustrated in FIG. 1A is a blended wing body where both the fuselage and the wings are designed to produce lift when traveling through air. The inventions described herein, however, may be applied to any lifting structure.

The wings have a rearward sweep angle 146. This reduces the onset of shock waves as the aircraft approaches Mach 1. The inventions described herein, however, may be applied to wings with any sweep angle, including a forward sweep angle.

The lifting structure is designed to produce sufficient lift at a transition velocity such that the aircraft will remain aloft when the rotors are stopped and locked into place.

The aircraft 100 may further comprise:
- a) a first rotor motor 160;
- b) a first rotor drivetrain 161 adapted to transmit mechanical power from said first rotor motor to said first mast and hence to said first rotor;
- c) a second rotor motor 164; and
- d) a second rotor drivetrain 165 adapted to transmit mechanical power from said second rotor motor to said second mast and hence to said second rotor.

The rotor motors may be located in the wings close to the winglets. This will minimize the weight and mechanical slop in the drivetrains.

The rotor motors may be electric motors. The electric motors may receive power from a battery 173 via one or more electrical connections 175, 176. An advantage of an electric rotor motor is that it facilitates a smooth reduction in rotor speed while maintaining efficiency as the aircraft increases in forward speed due to thrust from the auxiliary power plant.

The winglets may be dimensioned to hold a set of 1 or more rotor control servos 162, 166 per winglet. Three rotor control servos, for example, may be provided to independently control the attack angle of each blade. The dimensions of the winglets may be selected to minimize drag when the aircraft is in forward flight. The winglet height 145 may be kept low so that the rotor height 149 above the center of mass 148 of the aircraft will be kept low. This will facilitate three axis 185 control during the second flight mode as described below with reference to FIG. 3 et seq. The winglets may be vertical or at an angle with respect to the vertical. The winglets may also have a sweep angle with respect to the vertical. The winglets may proceed downward from the lifting structure. The rotors would then be mounted below the winglets.

The rotor control servos may be electrically or hydraulically driven under the control of the control system. The rotor control servos may mechanically transmit control actions to the rotors via control actuators 163, 167. Each control actuator may comprise a swash plate (not shown) for individually controlling the attack angles (e.g. 127) of the blades 121, 122, 123, 124 of the rotors.

Provision may be made for a human pilot. A cockpit (not shown) may be provided. The aircraft may also be operated by remote control or may have autonomous operation.

The aircraft may further comprise a first rotor locking mechanism 125 and a second rotor locking mechanism 126. The locking mechanisms are designed to engage one or more of the rotor motors, rotor drivetrains, masts, or rotors themselves to hold each rotor at a fixed azimuth angle 301, 302 (FIG. 3) during a second flight mode where the auxiliary propulsion unit provides forward thrust and the forward velocity is sufficient for the lift 181 from the lifting structure at its center of lift 182 to keep the aircraft aloft.

An exemplary locking mechanism is a pin that is reversibly inserted into a rotor motor to lock it in place. Any locking mechanism, such as a clamp, may be used. An advantage of a locking mechanism is that electric power is not needed to hold said rotors at said fixed azimuth angles during said second flight mode. The locking mechanism may be a high torque electric motor that can continuously adjust the azimuth angles when powered, but will hold a fixed azimuth angle when not powered.

The auxiliary propulsion unit may be any propulsion unit, such as a propeller, ducted fan, or jet engine. The auxiliary propulsion unit may be driven by an electric motor (not shown) and receive power via an electrical connection 174 to said battery 173.

Alternatively, the auxiliary propulsion unit may be a fuel powered device, such as a jet engine. An advantage of a fuel powered device is that it may comprise a generator 177 for recharging said battery.

The auxiliary propulsion unit may provide directional thrust 147. An advantage of directional thrust is that the auxiliary propulsion unit can provide pitch and yaw control (e.g. axes 185) when the auxiliary propulsion unit is engaged.

The first rotor 102 may comprise a first blade 121 and a second blade 122. The second rotor may comprise a first blade 123 and a second blade 124. A faring (e.g. 138) may be provided between each first and second blade to reduce drag.

More than two blades may be provided with each rotor. In a three-blade rotor, for example, the first and second blade may be at angle of about 120 degrees with respect to each other. Any number of blades per rotor may be provided.

The width 141 of the blades may be selected to provide adequate lift during a first flight mode and adequate control with minimal drag during said second flight mode. Said first flight mode may be a hover mode where lift, forward motion, backward motion, and lateral motion are provided by the rotors. One or more of roll, pitch, and yaw control may be provided by varying the attack angle of the rotors. Attack angle control may be implemented by swash plate control.

The width of the rotor blades may be about uniform over the length of a blade. The widths of the blades may be the same or may be different. The widths of the blades may vary over their length. The blades, for example, may be wide at their root and more narrow at their tip. This will provide greater twist resistance during flight. A counter twist may be built into the blades such that they induce less drag from a more desirable twist distribution.

The exemplary embodiment of FIG. 1A shows the two rotor blades in a tandem configuration. The rotors may be sized to have acceptably small downwash for rescue operations of persons.

The lengths 140 of each blade may be about the same. The lengths may alternatively be different. The lengths of the blades may be about equal to or less than the lateral distance 144 from the aircraft centerline 142 to each mast axis (e.g. 143). Thus, in said first flight mode, the rotors may synchronously counter rotate 183, 184 to provide lift before the auxiliary propulsion unit is engaged. During said first flight mode, each blade provides lift (e.g. 180) acting on a center of lift (e.g. 186). Control of the aircraft during said first flight mode may be by standard controls (e.g. a swash plate) for a tandem rotor aircraft.

In an alternative embodiment, the rotors may be intermeshing. In said embodiment, the rotors may be mounted on pylons (not shown) proceeding from the lifting body 108.

In an alternative embodiment, the rotors may be coaxial. In said embodiment, the masts may be mounted in a single pylon (not shown) proceeding from the lifting body. Said single pylon may be mounted proximate to the center of mass 148 of the aircraft.

Additional rotors may be provided depending upon design requirements and expected use, such as size and/or packaging constraints. Any number of rotors may be provided.

FIG. 1B is a cross section of a blade (e.g. 123) at a lateral vertical plane 132 (FIG. 1A). The blade may be symmetric about a vertical centerline 133. This will facilitate the control of the blades during said second flight mode since the forward edges of the first and second blades of each rotor will be the same. It also allows either blade of a rotor to be a forward blade or an aft blade.

Each blade may comprise a leading flap (e.g. 128) and a trailing flap (e.g. 129). A trim angle (e.g. 130 FIG. 1A) of each flap may be independently controlled by a servo (not shown) in each blade. Control and power to said blade servos may be through electrical connections (not shown) from the control system 111 through a swash plate (e.g. brushes or capacitive and/or inductive coupling) and into the blades.

FIG. 1B shows a blade with a positive attack angle 127 between a chord 134 of said blade and a horizontal 135. A positive angle of attack provides lift. A negative angle of attack provides downward force. A negative angle of attack is useful for three axis control as described in more detail below.

FIG. 1B shows the leading flap 128 and trailing flap 129 in a drag-only configuration. The utility of said configuration with respect to yaw control during said second flight mode will be described in greater detail with respect to FIG. 6. The leading and trailing flap may alternatively be adjusted to increase or decrease the lift of a blade.

Control System

Figure 2:
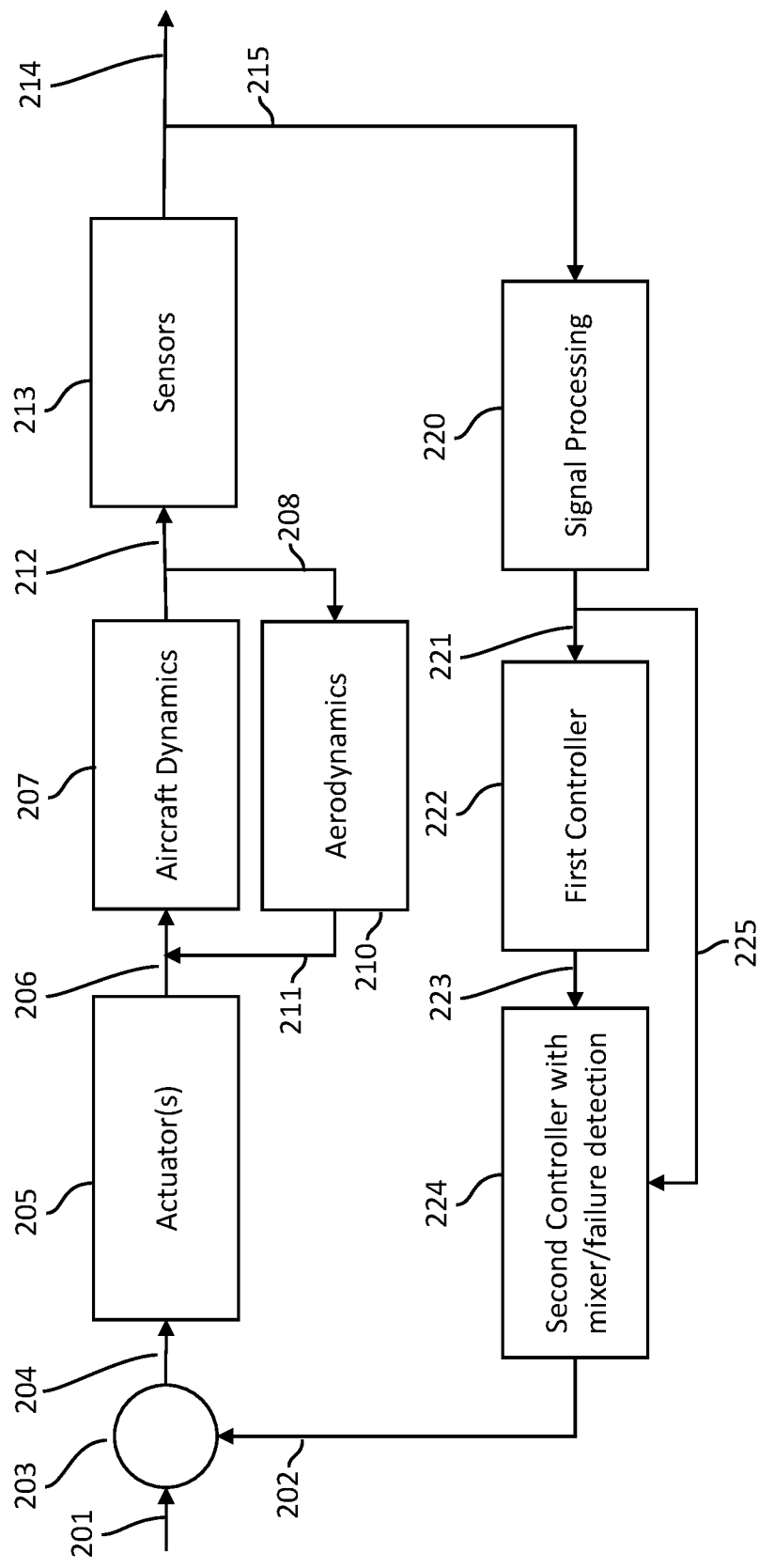
FIG. 2 is a block diagram of a control system for the aircraft of FIG. 1A.

FIG. 2 is a block diagram of a control system 200 used for controlling the aircraft. The control system may comprise one or more of a computer-based system, an electronic analog system, a fluid mechanical system, a mechanical system, or combinations thereof.

The control system may comprise an input device for receiving an input signal 201. The input signal may be from a human pilot, a sensor, another control system, or any other source.

A summing junction 203 may be provided to combine the input signal 201 with a feedback control signal 202. The combined signals 204 are fed into one or more actuators 205. The actuators control 206 various control surfaces of the aircraft, such as the attack angles of one or more rotor blades. The aircraft 207 responds 212 to the movements of the control surfaces. This affects 208 the air flowing around the aircraft 210. The changes in the airflow feedback 211 to the aircraft response 207.

Sensors 213 on the aircraft (e.g. pilot tubes, accelerometers, strain gauges, gyroscopes, etc.) sense one or more of the aircraft responses and the air flow responses to the control surface adjustments. The sensor signals 215 are processed 220 (e.g. amplification, noise reduction, etc.) and fed into 221 at least a first controller 222. If the controller senses a deviation from a desired aircraft response 214, then a control signal 223 may be generated. For example, if the control system detects the onset of an unacceptable vibration, then a control signal would be generated to dampen out said unacceptable vibration.

The signal may also be fed 225 into a second controller 224. The second controller may also detect a deviation from a desired aircraft response and generate an appropriate control signal. The second controller may further comprise a mixer for mixing the two control signals or a failure detection module. If the failure detection module detects a failure of one of the controllers, then the signal from the properly functioning controller will be fed back 202 to the summing junction. Any number of additional controllers may be provided.

The first and second controllers may have different control algorithms designed to control different actuators in response to a deviation. For example, the first controller may control the pitch of one or more of the blades and the second controller may control one or more of the leading or lagging flaps on the blades. The outputs of the controllers may be coordinated to respond to a deviation, such as the onset of unacceptable vibration. Thus, the two independent systems can act as backup for each other in the event that one of the systems fails. If both systems are operating properly, then one of the systems may be preferred (e.g. the flap control) with the other serving as a backup in case the preferred system fails.

A challenge in aircraft design is to have multiple backup systems for safety without adding undue weight or complexity.

The control system may be recursive. For example, the controller 222 may comprise all of the elements of the control system 200. For example, a control system for roll, pitch, and yaw control may have a control system for vibration suppression nested within it.

Flight Modes

The high-speed vertical take-off and landing aircraft 100 may have three flight modes. The flight modes may be a first flight mode, an intermediate flight mode, and a second flight mode. Other flight modes may be provided (e.g. supersonic).

The first flight mode is a rotor-only flight mode. The rotors rotate about their respective masts to provide lift and lateral motion. Roll, pitch, and yaw control may also be provided by the rotors using standard rotor control techniques.

The intermediate flight mode is a rotor+auxiliary propulsion unit flight mode. The auxiliary propulsion unit provides forward thrust. The lifting structure provides some lift due to the aircraft's forward motion through the air. The spinning rotors provide additional lift as needed. As the speed of the aircraft increases, the rotational speed of the rotors can be decreased. This reduces the parasitic drag of the rotors. An advantage of driving the rotors with electric powered rotor motors is that slowing the rotors is straightforward as it does not result in significant efficiency and/or multiple drivetrain resonances if properly designed.

As long as the rotors are rotating, they can provide at least one of roll, pitch, and yaw control by varying the attack angle of the rotors. If the auxiliary propulsion unit has directional thrust, then it can provide additional pitch and yaw control.

At a high enough aircraft speed (e.g. the transition speed), the lifting structure provides enough lift so that the rotors can be stopped. This is the second flight mode. When the rotors are stopped, then roll, pitch, and yaw control can be provided by varying the attack angles of the rotor blades.

Roll Control in the Second Flight Mode

Figure 3:
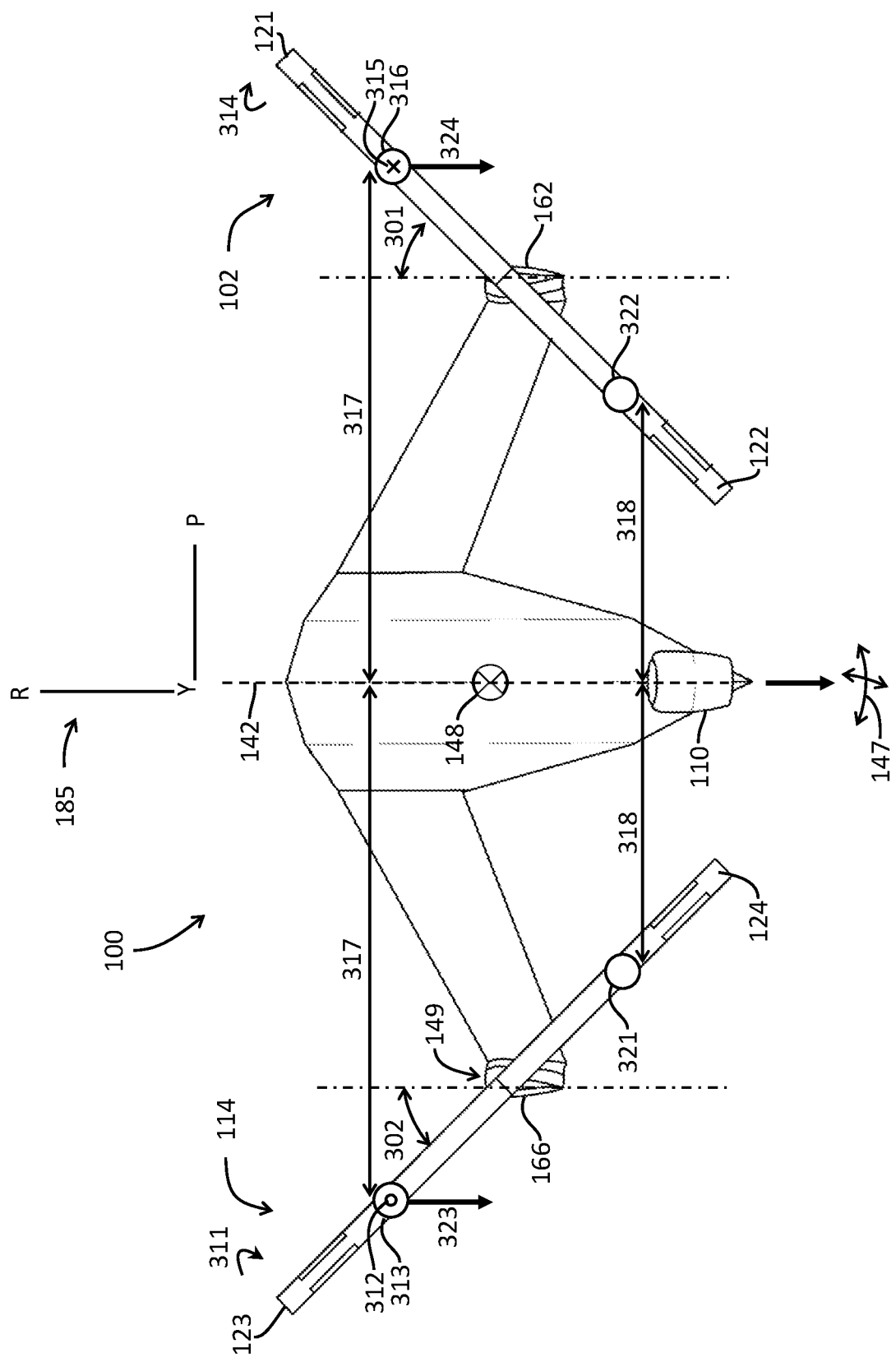
FIG. 3 is a plan view of the aircraft of FIG. 1A illustrating roll control with the rotors at fixed azimuth angles.

FIG. 3 is a plan view of the high-speed vertical take-off and landing aircraft 100 illustrating roll control with the rotors 102, 114 at fixed azimuth angles 301, 302. The aircraft is in the second flight mode. Forward thrust is provided by the auxiliary propulsion unit 110. As described above, the rotors may be held in place by one or more locking mechanisms.

The angle of attack of each blade (e.g. 311, 314) may be independently varied by the control servos 162, 166 in the winglets. The lift (e.g. 312, 315) generated by the angle of attack of each blade acts at the center of lift (e.g. 313, 316, 321, 322) of each blade. Positive lift is shown as a dot. Negative lift is shown as an "X". The size of a dot or "X" indicates relative magnitude of the lift. The centers of lift for each blade are shown at about the midpoint of each blade for simplicity. The actual centers of lift may be determined by experimentation and/or computational fluid dynamic simulations and optimization. The positions of the center of lift may vary with flow regime (e.g. laminar, turbulent, subsonic, supersonic, etc.), blade design, azimuth angles, and other factors. The three axis control schemes (i.e. roll, pitch, and yaw control) described herein may be modified according to the actual positions of the centers of lift.

The blades will generate drag (e.g. 323,324). For simplicity, a center of drag for a blade is shown coincident with the center of lift of said blade. The actual centers of drag may be determined by the methods described above with respect to determining the actual positions of the centers of lift.

Drag may comprise a form drag and an induced drag. Form drag tends to be proportional to lift. Induced drag tends to grow nonlinearly as the square of the lift. This nonlinearity will allow for yaw control using the angle of attack of the blades as described below with respect to FIG. 5.

The azimuth angles 301, 302 of the rotors may be set at a value between −90 degrees and +90 degrees. As used herein, positive first azimuth angle 301 for the first rotor 102 (e.g. right rotor) is measured to the right in a plan view. Positive second azimuth angle 302 for the second rotor 114 (e.g. left rotor) is measured to the left. The first and second azimuth angles are shown to be about the same. This simplifies control calculations. The first and second azimuth angles may be different, however, in certain situations, such as when the center of mass 148 of the aircraft is laterally offset from the aircraft centerline 142.

A suitable range of azimuth angles that will allow for three axis control by varying blade angle of attack is 15 degrees to 60 degrees or −15 degrees to −60 degrees. Azimuth angles in this range allow the blades to provide significant control moments about the roll, pitch, and yaw control axes 185. When the azimuth angles are positive, then the first blades are forward and outboard of the second blades. When the azimuth angles are negative, the first blades are forward and inboard of the second blades.

The locking mechanism for the blades may be adapted to allow for multiple preset azimuth angles. The locking mechanism for the blades may also be adapted to provide continuous adjustment of the azimuth angles. A screw based locking mechanism can provide continuous adjustment of the azimuth angles with very low power draw.

At relatively low Mach numbers, such as less than 0.7, the azimuth angles may be set to a relatively high value, such as a value in the range of 30 to 60 degrees. This will provide relatively large moment arms about each control axis. At relatively high Mach numbers, such as 0.7 or greater, the azimuth angles may be set to a relatively low value, such as a value in the range of 15 degrees to 30 degrees. This will delay the onset of shock waves. A further advantage of relatively low azimuth angles is a reduction of drag without the necessity to fold or store the blades during the second flight mode. This allows for greater simplicity of design and lower weight of the aircraft.

FIGS. 3 to 6 show the azimuth angles set to about 45 degrees. The first blade (121, 123) of each rotor is outboard and forward of the second blade (122, 124 respectively) of each rotor. The front latitudinal moment arms 317 of the centers of lift of the first blades about the centerline 142 of the aircraft are about equal. The front latitudinal moment arms of the first blades are also larger than the rear latitudinal moment arms 318 of the second blades. Thus, the first blades will have greater roll authority than the second blades.

Roll control of the aircraft while it is in the second flight mode may be achieved at least in part by the steps:
  a) vary the attack angle 314 of the first blade 121 of the first rotor 102 by a roll control angle; and
  b) vary the attack angle 311 of the first blade 123 of the second rotor 114 by about a negative of said roll control angle.

Since the change in the attack angle of the first blade of the second rotor is about equal to the negative of the change in the attack angle of the first blade of the first rotor, there is no net lift generated. Thus, there is no net longitudinal pitch moment created by the changes in lift.

The changes in drag 323, 324 on the first blades are the same so there is no net yaw moment generated. The changes in drag, however, may cause a change in the pitch moment depending upon the difference in vertical height 149 between the blades and the center of mass. The vertical height difference can be designed to be small so that this effect is minimized. Alternatively, a counteracting adjustment in pitch moment can be provided by varying the attack angles of the second blades of the rotors. This is described in more detail below with respect to FIG. 4.

Roll control can be alternatively achieved by varying the attack angles of the second blades of the rotors in a manner similar to that described above with respect to the first blades. The second blades will have less roll authority than the first blades due to the smaller latitudinal moment arms 318. Less authority for a given change in attack angle of the blades may be desirable at higher speeds since the roll control will be less sensitive to errors in attack angle control.

Pitch and yaw control may alternatively be achieved by varying the directional thrust 147 of the auxiliary propulsion unit. Thus, the aircraft has three axis control even if only roll control is provided by the rotor blades.

Pitch Control in the Second Flight Mode

Figure 4:
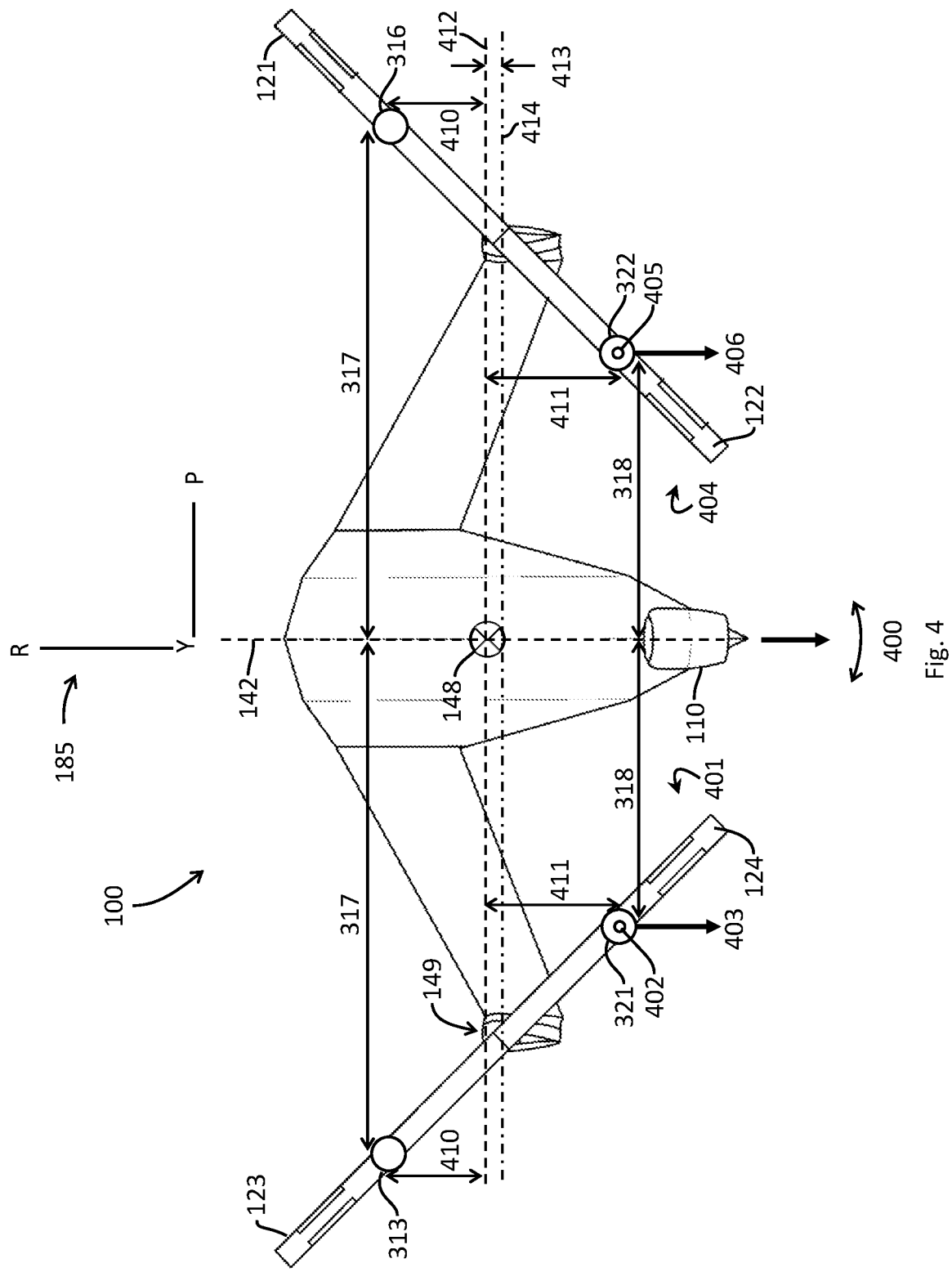
FIG. 4 is a plan view of the aircraft of FIG. 1A illustrating pitch control with the rotors at fixed azimuth angles.

FIG. 4 is a plan view of the high-speed vertical take-off and landing aircraft 100 illustrating pitch control with the rotors at the same fixed azimuth angles of FIG. 3.

Pitch control may be achieved at least in part by the steps:
a) vary the attack angle 404 of the second blade 122 of the first rotor by a pitch control angle; and
b) vary the attack angle 401 of the second blade 124 of the second rotor by about said pitch control angle.

The change in lift 405 of the second blade of the first rotor is about equal to the change in lift 402 of the second blade of the second rotor. The rear latitudinal moment arms 318 about the aircraft centerline 142 are also the same. Hence there is no net roll moment created by the change in pitch moment.

The change in drag 406 for the second blade of the first rotor is the same as the change in drag 403 for the second blade of the second rotor. There is no net yaw moment, therefore, since the changes in drag are balanced.

The change in pitch moment due to the change in drag on the second blades acting on the rotor height 149 above the center of mass may offset somewhat the change in pitch moment due to the change in lift on the second blades. The control system can be modified accordingly to take this into account.

In the example shown in FIG. 4, the longitudinal position 412 of the center of mass 148 is forward of the longitudinal position 414 of the masts of the rotors. A suitable amount of longitudinal offset 413 may be in the range of 0.05 to 0.3 times a blade length. A longitudinal offset of about 0.1 times the blade length is shown in FIG. 4. Longitudinal offsets in this range allow for adequate pitch control during the second flight mode as well as adequate pitch control during the first flight mode, such as by swash plate control. The aircraft is still functional, however, for offsets outside of this range, including negative offsets.

The longitudinal moment arm 411 of the centers of lift 321, 322 of the second blades 124, 122 is larger than the longitudinal moment arm 410 of the centers of lift 313, 316 of the first blades 123, 121 in the example presented. Hence, the pitch authority of the second blades is larger than the pitch authority of the first blades.

As described above, the roll authority of the second blades is less than the roll authority of the first blades. The roll sensitivity to errors in the changes in attack angles of the second blades, therefore, will be less than that of the first blades. Nonetheless, pitch control can be achieved by varying the angles of attack of the first blades by about equal angles. An advantage of having the capability to use the first blades for pitch control is that it provides redundancy in the event of failure of the attack angle control of the second blades.

An advantage of using the attack angles of the rotor blades for both roll and pitch control is that an auxiliary propulsion unit 110 with only horizontally variable directional thrust 400 is needed for three axis 185 control. This reduces the complexity and weight of the auxiliary propulsion unit or alternatively, makes the control system redundant in case of a failure in the vertical directional thrust control of an auxiliary propulsion unit.

Yaw Control in the Second Flight Mode

Figure 5:
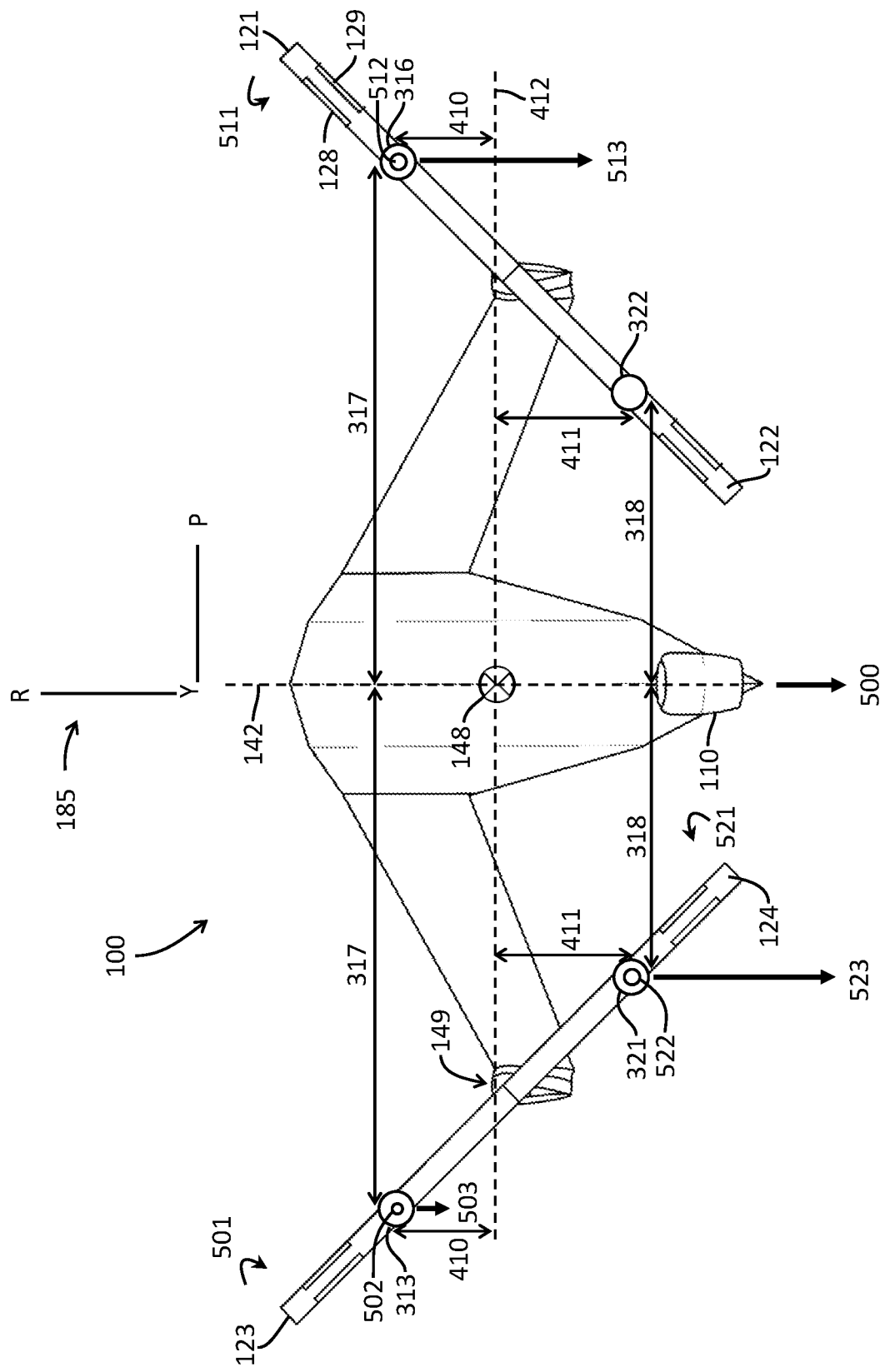
FIG. 5 is a plan view of the aircraft of FIG. 1A illustrating yaw control with the rotors at fixed azimuth angles.

FIG. 5 is a plan view of the high-speed vertical take-off and landing aircraft 100 illustrating yaw control with the rotors at the same fixed azimuth angles of FIG. 3.

Yaw control may be achieved at least in part by the steps:
a) vary the attack angle 511 of the first blade 121 of the first rotor by a first yaw control angle;
b) vary the attack angle 501 of the first blade 123 of the second rotor by a second yaw control angle; and
c) vary the attack angle 521 of the second blade 124 of the second rotor by a third yaw control angle
such that:
d) said aircraft will have a net yaw moment to about a center of mass 148; and
e) no net roll moment or pitch moment will be created about said center of mass.

For the sake of simplicity, the effect of rotor height 149 above the center of mass will be neglected in the analysis below. Nonetheless, the rotor height can be taken into account for more precise calculations using the same principles.

The net roll moment on the aircraft created by the attack angle changes of the blades can be expressed as:

$$M_R = L_{1,1}X_F - L_{2,1}X_F - L_{2,2}X_R$$

The net pitch moment on the aircraft created by the attack angle changes of the blades can be expressed as:

$$M_P = L_{1,1}Y_F + L_{2,1}Y_F - L_{2,2}Y_R$$

The net yaw moment on the aircraft created by the attack angle changes of the blades can be expressed as:

$$M_Y = D_{1,1}X_F - D_{2,1}X_F - D_{2,2}X_R$$

The symbols in said equations are defined in table 1.

TABLE 1

| Description | Element Number | Symbol |
|---|---|---|
| Net roll moment | | $M_R$ |
| Net pitch moment | | $M_P$ |
| Net yaw moment | | $M_Y$ |
| Lift of the first blade of first rotor | 512 | $L_{1,1}$ |
| Lift of the first blade of second rotor | 502 | $L_{2,1}$ |
| Lift of the second blade of second rotor | 522 | $L_{2,2}$ |
| Induced drag of the first blade of first rotor | 513 | $D_{1,1}$ |
| Induced drag of the first blade of second rotor | 503 | $D_{2,1}$ |
| Induced drag of the second blade of second rotor | 523 | $D_{2,2}$ |
| Front latitudinal moment arm | 317 | $X_F$ |
| Rear latitudinal moment arm | 318 | $X_R$ |

TABLE 1-continued

| Description | Element Number | Symbol |
|---|---|---|
| Front longitudinal moment arm | 410 | $Y_F$ |
| Rear longitudinal moment arm | 411 | $Y_R$ |
| Scaling parameter to convert lift to induced drag | | a |

By setting $M_R$ equal to zero (i.e. not net roll moment created by said attack angle changes) and $M_P$ equal to zero (i.e. no net pitch moment created by said attack angle changes), one can get the following equations useful for calculating the required lifts for the first blade of the second rotor and the second blade of the second rotor as a function of a set point for the lift of the first blade of the first rotor:

$$L_{2,1} = \frac{\left(1 - \frac{X_R Y_F}{X_F Y_R}\right)}{\left(1 + \frac{X_R Y_F}{X_F Y_R}\right)} L_{1,1}$$

$$L_{2,2} = \frac{Y_F}{Y_R}(L_{1,1} + L_{2,1})$$

The induced drags created on each blade are equal to the square of the lifts times a scaling parameter a. The net yaw moment, therefore, created by the set point for the lift of the first blade of the first rotor and the corresponding lifts required of the first blade of the second rotor and the second blade of the second rotor is given by:

$$M_Y = aL_{1,1}^2 X_F - aL_{2,1}^2 X_F - aL_{2,2}^2 X_R$$

Thus, the net change in yaw moment will be towards the first blade of the first rotor irrespective of whether the set point change in the attack angle of the first blade of the first rotor is positive or negative.

To get a net change in the yaw moment towards the first blade of the second rotor, a set point may be established for a change in the attack angle of the first blade 123 of the second rotor and the attack angles of the first blade 121 and second blade 122 of the first rotor are adjusted so that there is no net change in the roll or pitch moment of the aircraft. The equations presented above can be used to calculate these values.

When adjustment of the attack angles of the blades is used to effect three axis 185 control, then the auxiliary power plant 110 can have a unidirectional thrust 500. This may either be by design to save weight and complexity or it may be due to one or more failures in the directional control of the thrust.

Three Axis Control Using Leading and Trailing Flaps

Figure 6:
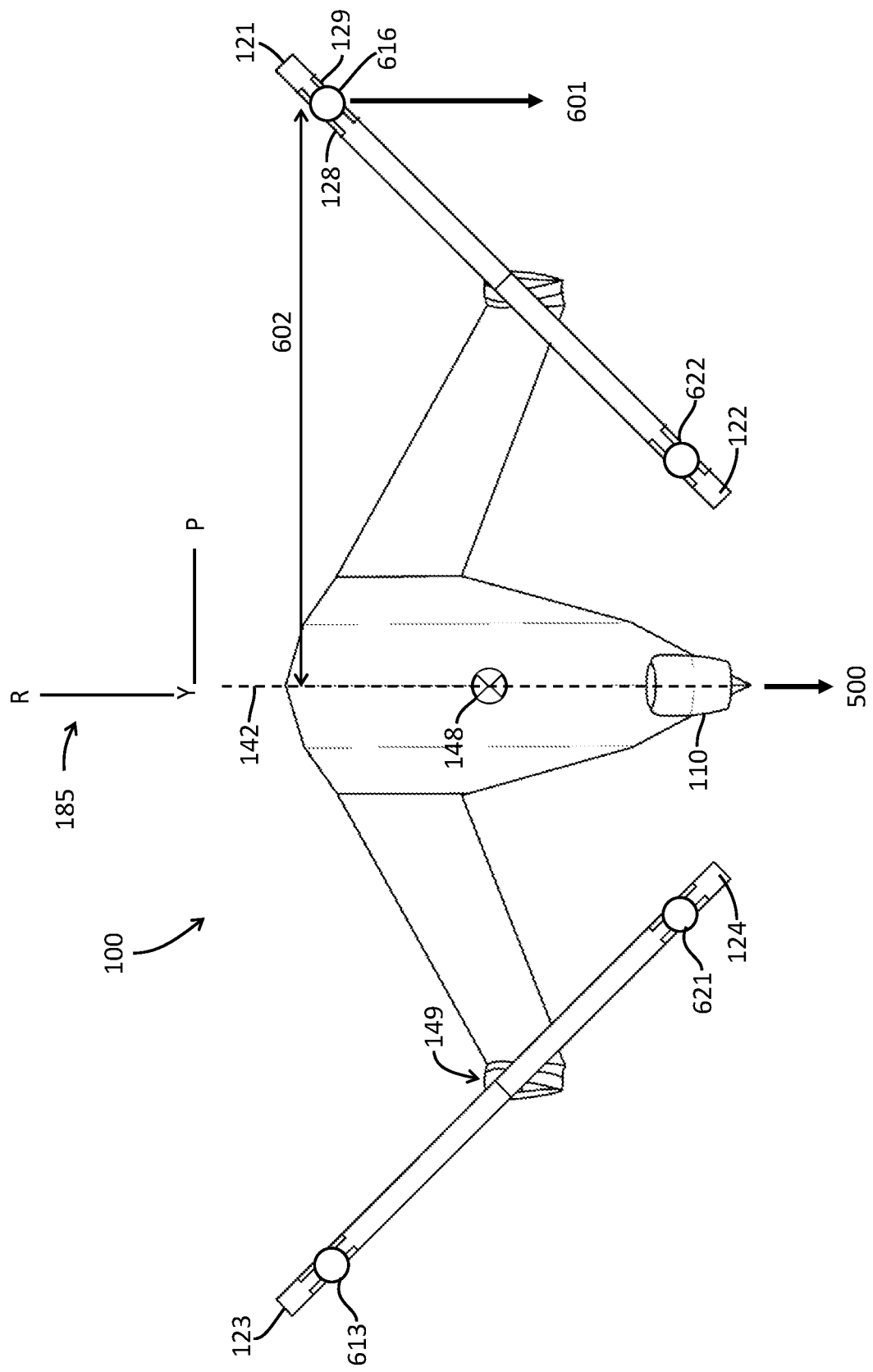
FIG. 6 is a plan view of the aircraft of FIG. 1A illustrating alternative three axis control with the rotors at fixed azimuth angles.

FIG. 6 is a plan view of the high-speed vertical take-off and landing aircraft 100 illustrating three axis 185 control during the second flight mode using leading 128 and trailing 129 flaps.

One or more of each pair of flaps on the rotor blades 121, 122, 123, 124 can be adjusted to vary the lift of each rotor blade. The respective centers of lift 613, 616, 621, 622 of the flaps are used to determine the respective moment arms (e.g. 602) about the center of mass 148. Roll, pitch, and yaw control can be effected by the methods described above with respect to varying the attack angles of the blades.

An advantage of using leading and trailing flap control is that the flaps can be set for a "drag only" configuration, such as that illustrated in FIG. 1A. The drag force (e.g. 601) and corresponding lateral moment arm (e.g. 602) can then be used to determine the change in yaw moment. There is no net lift so there is no need to adjust corresponding flaps on other blades as with blade attack angle control. If there is a significant rotor height 149 above the center of mass, however, then additional pitch control may be needed even if the flaps are set in drag only mode.

A further advantage to flap control on the blades is that aeroelastic control can be employed to counter act the onset of vibration modes in the rotors. Sensors, such as accelerometers, can be placed in the tips of the blades to detect undesired vibrations and the flaps can be controlled to dampen the vibration using the control system 200 (FIG. 2).

Providing three axis control during the second flight mode using flaps allows for the auxiliary propulsion unit to operate with unidirectional thrust 500.

Control Surfaces on Wings and Winglets

Figure 7:
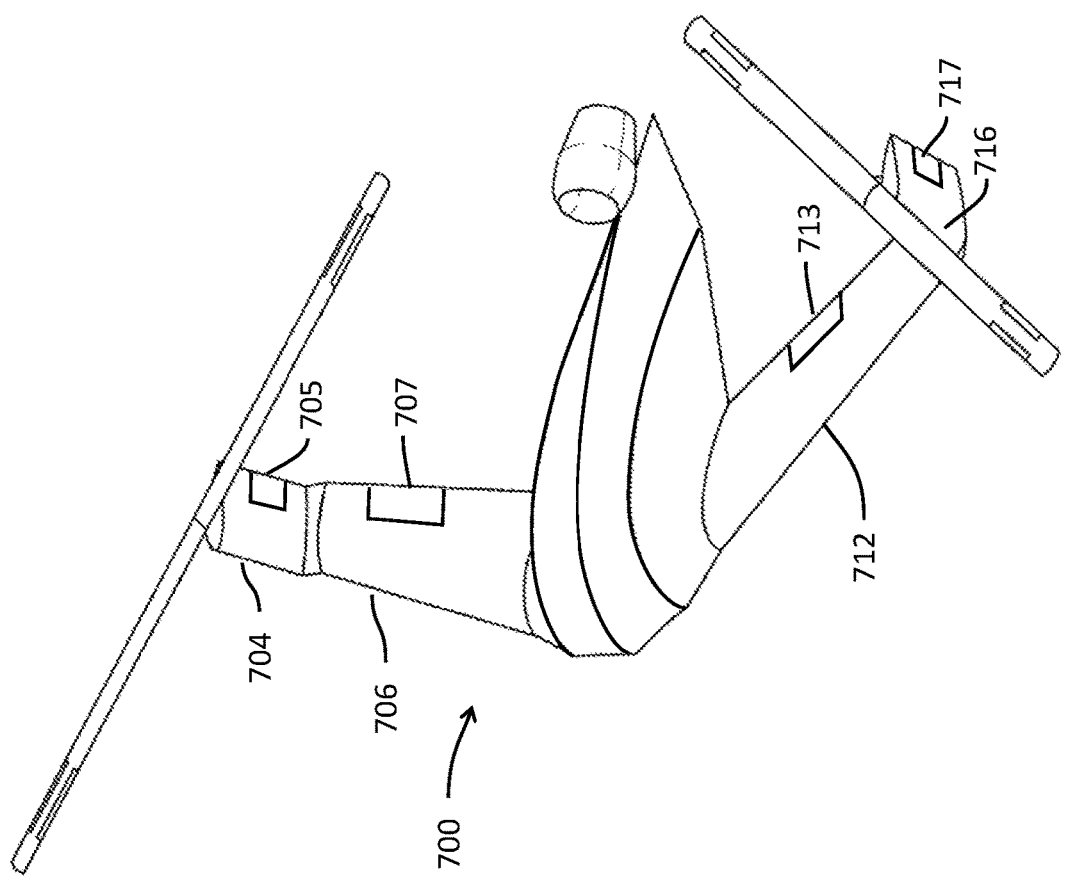
FIG. 7 is a perspective view of a high-speed, vertical take-off and landing aircraft with control surfaces on its wings and winglets.

FIG. 7 is a perspective view of a high-speed, vertical take-off and landing aircraft 700 with control surfaces 705, 707, 713, 717 on its wings 706, 712 and winglets 704, 716. These control surfaces add weight and complexity to the aircraft, but allow for three axis control during the second flight mode using standard control techniques.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. For example, the first and second rotors may be coaxial and corotational with an offset in the range of 60 to 90 degrees (e.g. a single four bladed rotor). In this configuration, a tail rotor may be provided for control during at least the first flight mode. Therefore, it is intended that the disclosure not be limited to the particular embodiment disclosed as the best mode contemplated for carrying out this invention.

What is claimed is:
1. An aircraft comprising:
   a) a lifting structure;
   b) a first rotor comprising:
      i) a first blade; and
      ii) a second blade;
   c) a second rotor comprising:
      i) a first blade; and
      ii) a second blade;
   d) an auxiliary propulsion unit; and
   e) a control system adapted to independently control an attack angle of each of said blades, wherein:
   f) said first rotor:
      i) is operable to be rotated about a first mast to provide lift during a first flight mode; and
      ii) is operable to be held at a constant first azimuth angle during a second flight mode;
   g) said second rotor:
      i) is operable to be rotated about a second mast to provide lift during said first flight mode; and
      ii) is operable to be held at a constant second azimuth angle during said second flight mode;

h) said auxiliary propulsion unit is operable to provide forward thrust during said second flight mode;
i) to provide control to said aircraft during said second flight mode, said control system is operable to:
  i) vary an attack angle of said first blade of said first rotor by a roll control angle; and
  ii) vary said attack angle of said first blade of said second rotor by about-a negative of said roll control angle; and
j) to provide pitch control to said aircraft during said second flight mode, said control system is operable to:
  i) vary said attack angle of said second blade of said first rotor by a pitch control angle; and
  ii) vary said attack angle of said second blade of said second rotor by about said pitch control angle.

2. The aircraft of claim 1 wherein:
a) said azimuth angle of said first rotor during said second flight mode is in the range of 15 degrees to 60 degrees or in the range of −15 degrees to −60 degrees such that said first blade of said first rotor is forward and either outboard or inboard of said second blade of said first rotor; and
b) said azimuth angle of said second rotor during said second flight mode is close to or exactly the same as said azimuth angle of said first rotor such that said first blade of said second rotor is forward and either outboard or inboard of said second blade of said second rotor.

3. The aircraft of claim 1 wherein said control system further provides yaw control to said aircraft and wherein to provide said yaw control, said control system is operable to:
a) vary said attack angle of said first blade of said first rotor by a first yaw control angle;
b) vary said attack angle of said first blade of said second rotor by a second yaw control angle; and
c) vary said attack angle of said second blade of said second rotor by a third yaw control angle;
such that:
d) said aircraft will have a net yaw moment about a center of mass; and
e) no net roll moment or pitch moment will be created about said center of mass.

4. The aircraft of claim 1 wherein:
a) said rotation of said first rotor during said first flight mode is provided by a first electric motor; and
b) said rotation of said second rotor during said first flight mode is provided by a second electric motor.

5. The aircraft of claim 4 which further comprises:
a) a first drivetrain connecting said first electric motor to said first rotor;
b) a second drivetrain connecting said second electric motor to said second rotor; and
c) one or more locking mechanisms adapted to reversibly engage one or more of said electric motors or said drivetrains in order to hold said rotors at said azimuth angles during said second flight mode.

6. The aircraft of claim 4 wherein:
a) said lifting structure comprises a left wing and a right wing; and
b) said electric motors are mounted in said wings.

7. The aircraft of claim 1 wherein:
a) said auxiliary propulsion unit is adapted to provide directional thrust; and
b) said control system is adapted to control said directional thrust during said second flight mode to control one or more of a pitch or a yaw of said aircraft.

8. The aircraft of claim 1 wherein said control system is operable to:
a) increase a thrust of said auxiliary propulsion unit during an intermediate mode; and
b) slow a rotational speed of said first rotor and said second rotor as a forward velocity of said aircraft increases during said intermediate flight mode.

9. The aircraft of claim 1 wherein:
a) at least one of said blades comprises a leading flap and a trailing flap; and
b) said control system is operable to control said yaw of said aircraft during said second flight mode by adjusting said leading and trailing flap in order to control a drag on said at least one of said blades.

10. The aircraft of claim 1 wherein a cross section through at least one of said blades is symmetric about a vertical centerline.

11. The aircraft of claim 1 wherein:
a) said lifting structure comprises a left wing and a right wing;
b) each of said rotors is mounted on a vertical winglet attached to each of said wings; and
c) said rotors are in a tandem configuration.

12. The aircraft of claim 11 wherein:
a) one or more of said wings or winglets comprises a control surface; and
b) said control system is operable to control at least in part at least one of said pitch, yaw, or roll of said aircraft by controlling said control surface.

13. The aircraft of claim 1 wherein:
a) said lifting structure comprises a lifting body; and
b) said first and second rotors are intermeshing.

14. The aircraft of claim 1 wherein said first and second rotors are coaxial.

15. The aircraft of claim 14 wherein:
a) said first and second rotors are corotational and offset in the range of 60 to 90 degrees; and
b) said aircraft comprises a tail rotor.

16. An aircraft comprising:
a) a lifting structure comprising:
  i) a first winglet; and
  ii) a second winglet;
b) a first rotor comprising:
  i) a first blade; and
  ii) a second blade;
c) a second rotor comprising:
  i) a first blade; and
  ii) a second blade;
d) an auxiliary propulsion unit; and
e) a control system adapted to independently control an angle of attack of each of said blades
wherein:
f) said first rotor:
  i) is mounted above or below said first winglet;
  ii) is adapted to be rotated about a first mast to provide lift during a first flight mode and an intermediate flight mode;
g) said second rotor:
  i) is mounted above or below said second winglet;
  ii) is adapted to be rotated about a second mast to provide lift during said first flight mode and said intermediate flight mode;
h) said auxiliary propulsion unit is adapted to provide forward thrust during said intermediate flight mode; and
i) said control system is adapted to provide roll, pitch, and yaw control to said aircraft during said first flight mode and said intermediate flight mode, wherein to provide said roll control, the control system is further operable to:
- i) vary an angle of attack of said first blade of said first rotor by a roll control angle; and
- ii) vary said angle of attack of said first blade of said second rotor by a negative of said roll control angle, and j) to provide said pitch control, said control system is operable to:
- i) vary said angle of attack of said second blade of said first rotor by a pitch control angle; and
- ii) vary said angle of attack of said second blade of said second rotor by about said pitch control angle.

17. The aircraft of claim 16 wherein:
a) said first rotor is operable to be held at a fixed azimuth angle during a second flight mode;
b) said second rotor is operable to be held at a fixed azimuth angle during said second flight mode; and
c) said control system is operable to provide one or more the roll, pitch, or yaw of said aircraft during said second flight mode by variation of an angle of attack of at least one of said blades.

18. The aircraft of claim 16 wherein said lifting structure comprises a lifting body.

19. The aircraft of claim 16 wherein said first rotor and said second rotor are intermeshing.

20. The aircraft of claim 16, wherein to provide said yaw control, said control system is operable to:
a) vary said angle of attack of said first blade of said first rotor by a first yaw control angle;
b) vary said angle of attack of said first blade of said second rotor by a second yaw control angle; and
c) vary said angle of attack of said second blade of said second rotor by a third yaw control angle, such that:
d) said aircraft will have a net yaw moment about a center of mass; and
e) no net roll moment or pitch moment will be created about said center of mass.

* * * * *